No. 692,862. Patented Feb. 11, 1902.
F. E. KEYES.
MACHINE FOR THE MANUFACTURE OF SHEETS, BOARDS, OR TUBES FROM PULP.
(Application filed June 26, 1901.)
(No Model.) 5 Sheets—Sheet 1.
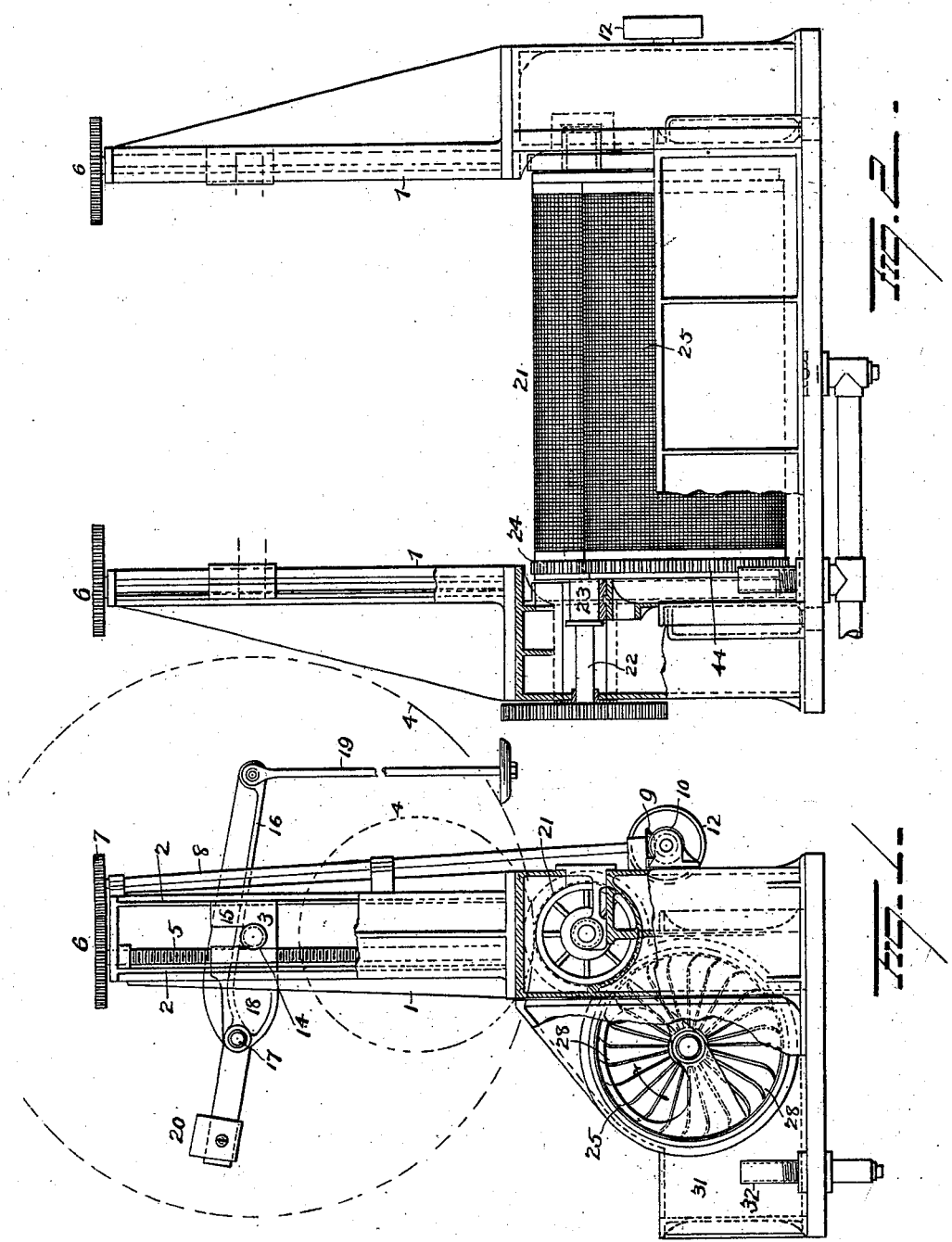
WITNESSES
E. J. Nottingham
G. F. Downing
INVENTOR
F. E. Keyes
By H. A. Seymour
Attorney No. 692,862. Patented Feb. 11, 1902.
F. E. KEYES.
MACHINE FOR THE MANUFACTURE OF SHEETS, BOARDS, OR TUBES FROM PULP.
(Application filed June 26, 1901.)
(No Model.) 5 Sheets—Sheet 2.
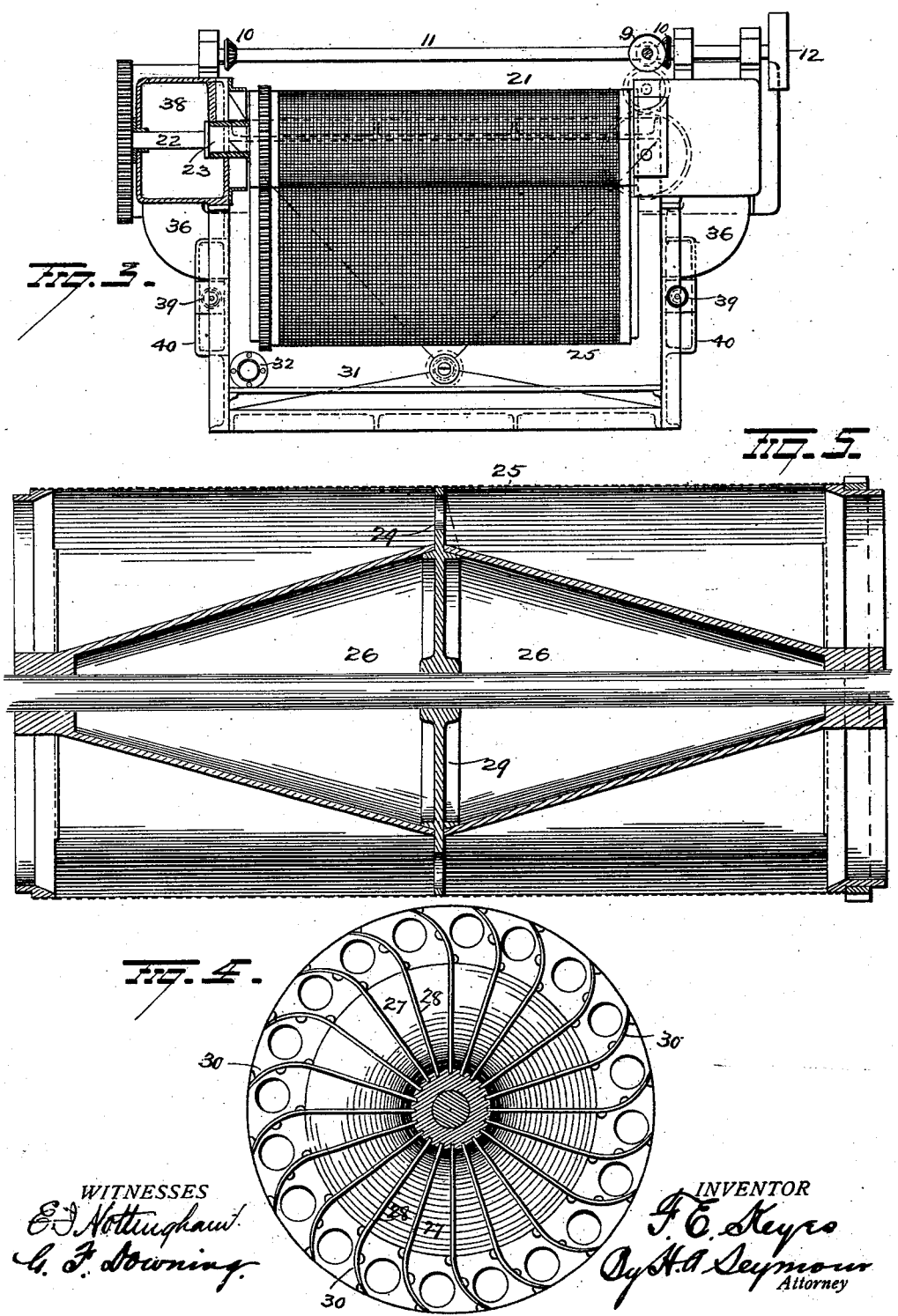

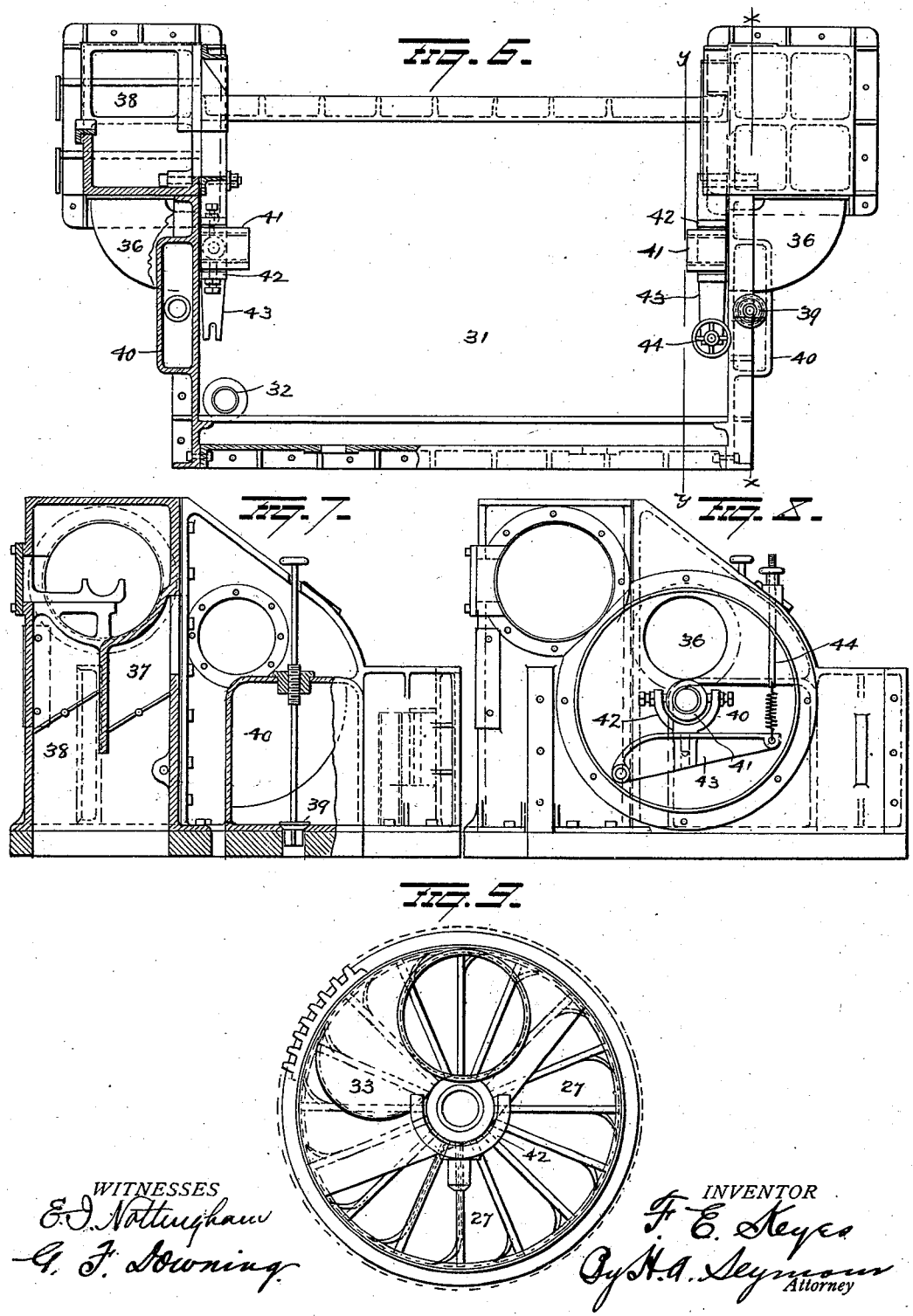

No. 692,862. Patented Feb. 11, 1902.
F. E. KEYES.
MACHINE FOR THE MANUFACTURE OF SHEETS, BOARDS, OR TUBES FROM PULP.
(Application filed June 26, 1901.)
(No Model.) 5 Sheets—Sheet 4.
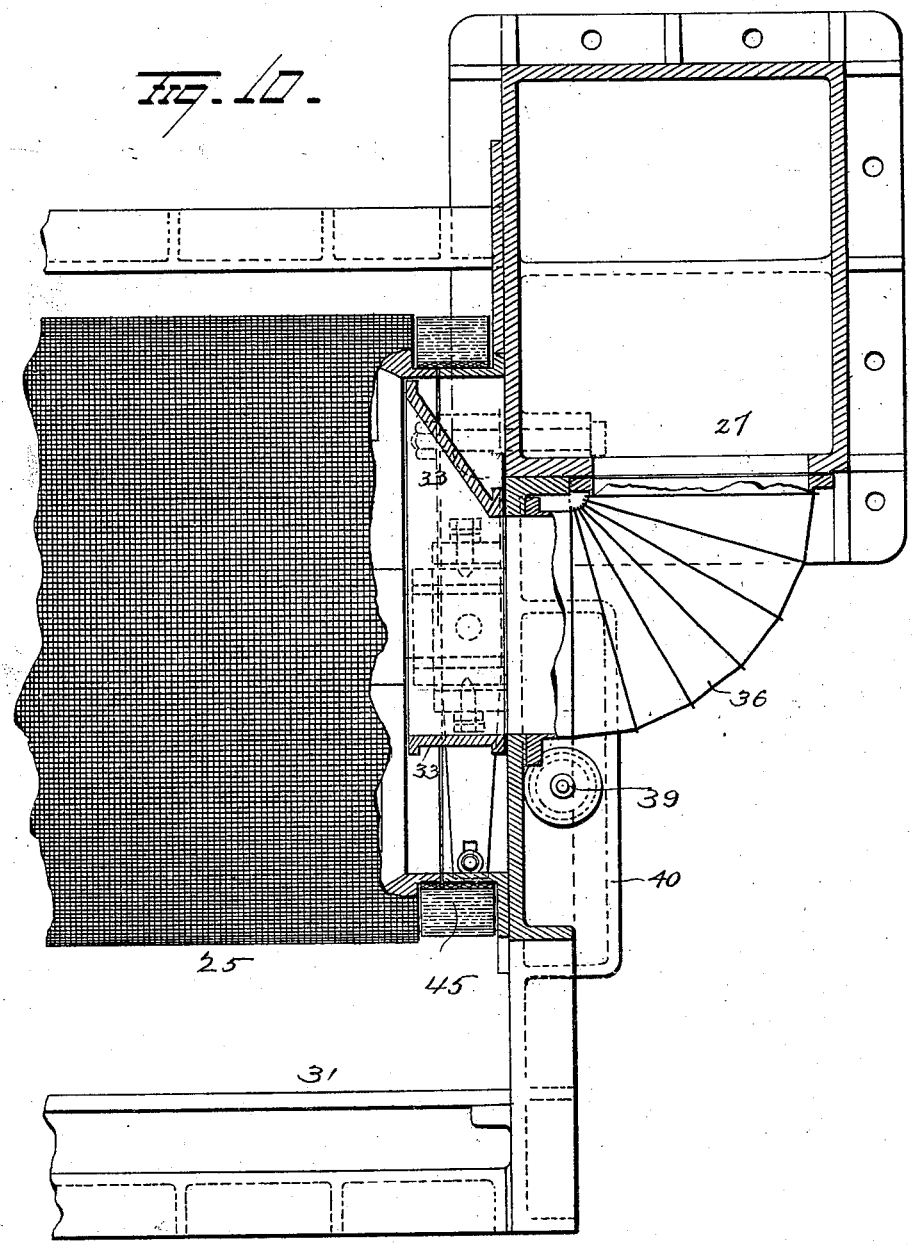

No. 692,862. Patented Feb. 11, 1902.
F. E. KEYES.
MACHINE FOR THE MANUFACTURE OF SHEETS, BOARDS, OR TUBES FROM PULP.
(Application filed June 26, 1901.)
(No Model.) 5 Sheets—Sheet 5.
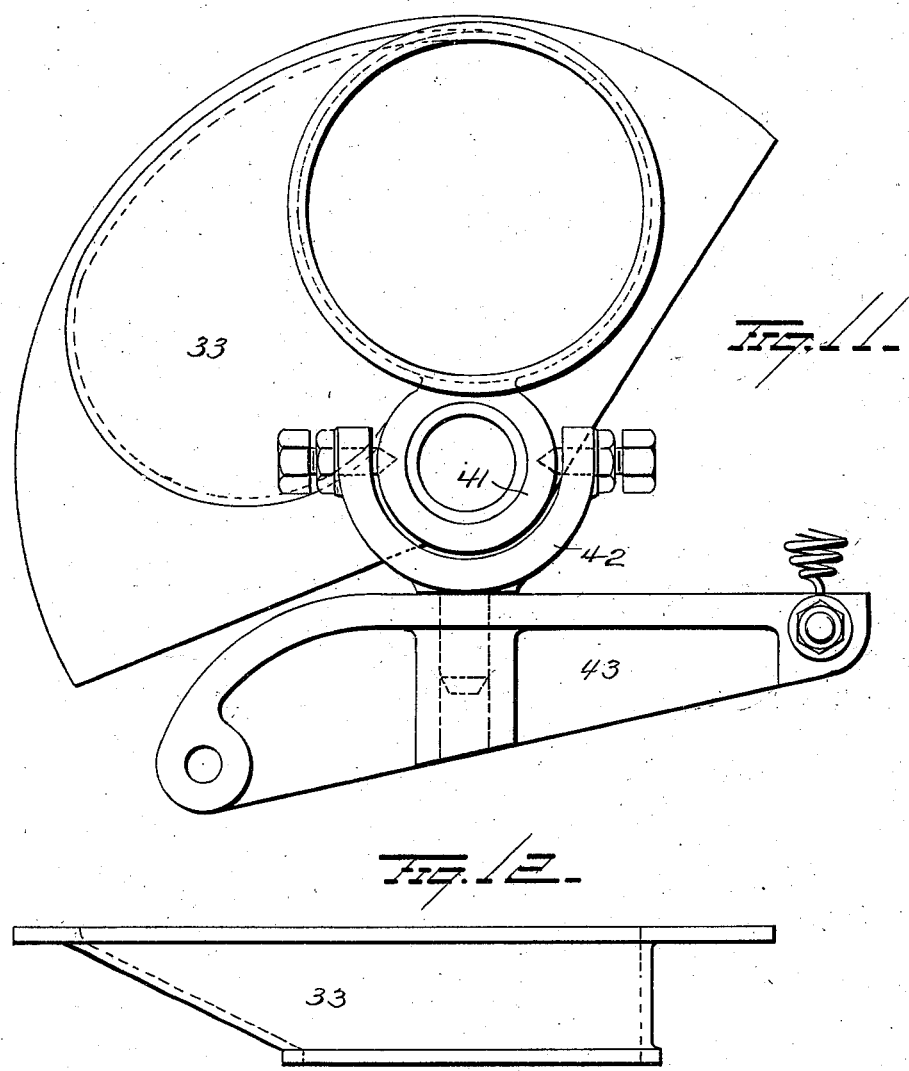

UNITED STATES PATENT OFFICE.

FRANK EUGENE KEYES, OF HOLYOKE, MASSACHUSETTS.

MACHINE FOR THE MANUFACTURE OF SHEETS, BOARDS, OR TUBES FROM PULP.

SPECIFICATION forming part of Letters Patent No. 692,862, dated February 11, 1902.

Application filed June 26, 1901. Serial No. 66,120. (No model.)

*To all whom it may concern:*

Be it known that I, FRANK EUGENE KEYES, of Holyoke, in the county of Hampden and State of Massachusetts, have invented certain new and useful Improvements in Machines for the Manufacture of Sheets, Boards, or Tubes from Pulp; and I do hereby declare the following to be a full, clear, and exact description of the invention, such as will enable others skilled in the art to which it appertains to make and use the same.

My invention relates to an improvement in machines for the manufacture of sheets, boards, or tubes from pulp, and has special reference to the machines in each of which there is employed a perforated or reticulated mold or pulp-cylinder divided internally into radial compartments and revolving in a vat containing the pulp, the said cylinder being so constructed and arranged that a layer of the pulp is caused to adhere to the periphery of the cylinder as the latter revolves and the superfluous moisture removed from the said layer of pulp by maintaining the radial compartments of the mold or pump-cylinder as they leave the pulp-vat and approach the couch in a vacuous condition, thus extracting the moisture from the fiber before the latter leaves the mold or pulp-roll. The layer of pulp so formed on the mold or cylinder is removed therefrom by the couch-roller and wound continuously upon another or winding roller until the required thickness has been obtained, after which the winding-roller is removed and the material that has been wound thereon is, if required in the form of a sheet, subsequently severed with a suitable tool and detached from the roller, after which it is opened out into flat form. Machines of this kind as at present constructed are open to several objections. For instance, winding-rollers of comparatively small diameter are necessarily employed, and it is absolutely necessary to remove them from the machine in order to remove the adhering material. Again, the compartments in the pulp mold or cylinder are so constructed that they discharge the water against the pulp adhering to the periphery of the pulp-mold after the level of the pulp has been passed, thus operating to dislodge portions of the adhering pulp.

The object of my invention is to so construct the parts as to permit of the employment of winding-rolls of various sizes and with devices whereby the adhering sheet or board may be removed from the machine without removing the winding-roll.

A further object is to provide means whereby the water taken into the compartments of the pulp roll or cylinder will be discharged therefrom without coming in contact with the adhering mass or film of pulp.

A further object is to provide improved means for holding the winding-roll or the layer of pulp thereon with a yielding pressure against the couch-roller.

With these ends in view my invention consists in the parts and combination of parts and in the details of construction, as will be more fully described, and pointed out in the claims.

In the accompanying drawings, Figure 1 is a view in end elevation, partly in section, of my improved apparatus. Fig. 2 is a front view, partly in section, of same. Fig. 3 is a plan view. Fig. 4 is a view in transverse section through the cylinder. Fig. 5 is a longitudinal sectional view of same. Fig. 6 is a plan view, partly in section, of the tub or vat, showing the shaft-bearings and air-pipes, flues, and dampers. Fig. 7 is a view in section on the line $xx$ of Fig. 6. Fig. 8 is a view in section on the line $yy$ of Fig. 6. Fig. 9 is a view in elevation looking toward the mold or cylinder, showing the air or exhaust box in position. Fig. 10 is an enlarged detail view in section, showing the pipe 36 and suction-box 33 and their relation to coöperating parts. Fig. 11 is an end view of one of the suction-boxes. Fig. 12 is a plan view of the suction-box.

1 represents a pair of standards or uprights formed with suitable vertical guideways 2, in which the bearings 3 of the winding-roller 4 are adapted to be raised or lowered to accommodate rollers of various sizes. In Fig. 1 I have shown in dotted lines two winding-rollers 4 of different diameters, with the bearings 3 adjusted for the larger roller. The bearings 3 are each provided with a screw-threaded opening or bore for the passage of a screw 5, which latter is mounted in suitable bearings in the uprights or standards 1. Each screw 5 is provided on its upper end, above its upright or standard 1, with a pinion 6, which latter is engaged by the pinion 7 on the slightly-inclined shaft 8, journaled in bearings on the rear side of the apparatus. Each shaft 8 is provided on its lower end with a bevel-pinion 9, which meshes with a bevel-pinion 10 on the horizontal shaft 11. This shaft 11 extends lengthwise the apparatus and carries both bevel-pinions 10 and a belt or gear-wheel 12, by which the shaft is driven. The power applied to pulley 12 on shaft 11 can be controlled by a treadle or hand-lever or any other suitable device, and when the shaft is in motion it will be seen that both screws 5 will rotate and either elevate or lower the bearings 3, carrying the trunnions 14 of the winding-roll 4. Hence after the proper thickness of fiber has been deposited on the winding-roll the latter can be elevated above the couch-roller and the sheet or board severed and unwound and deposited on a sliding table, which is introduced between the winding-roll and the couch-roll. This table does not form any part of this invention. Hence it is not shown. After the sheet or board has been removed from the winding-roll the table carrying the sheet or board is withdrawn, and by reversing the direction of motion of the screws 5 the winding-roll can be lowered onto the couch-roll in a position to take the adhering film of fiber therefrom.

The bearings 3 are each provided with an open slot 15, in which the trunnions 14 of the winding-roll rest and in which they move. The winding-roll rests with a yielding pressure on the couch-roll. Hence as the fiber is deposited on the winding-roll the latter is gradually elevated until the desired thickness of board has been obtained. The pressure on the winding-roll is regulated by the levers 16, which latter are pivoted at 17 to the arms 18. The arms 18 are integral with their respective bearings 3, and each lever 16 bears on a trunnion 14 of the winding-roll 4. The longer members of the arms 16 carry at their free ends the pendent rods 19, on which removable weights may be placed for increasing the pressure, while the shorter members of the levers 16 are provided with the adjustable weights 20, which are designed to counterbalance the weight of the longer members, thus permitting the machine to operate without any pressure other than the weight of the winding-roll. The fiber is delivered to the winding-roll from the couch-roll 21, the latter being mounted in the frame with its periphery in contact with the periphery of the pulp mold or cylinder. This couch-roll 21 is hollow, with a perforated or reticulated periphery, and is connected to the drive-shaft 22 by a coupling interposed at the point 23, so as to permit the roll to be removed and recovered or repaired, as necessity demands. The shaft 22 is provided with a pulley or gear through which motion is transmitted to the couch-roll, and the latter is provided with the toothed gear which transmits motion to the pulp-mold 25. This mold or cylinder 25 is provided centrally with a hollow core 26, which is of double conical shape in longitudinal section—that is to say, is in the shape of two hollow cones placed base to base—the portion outside of said central conical section being divided into compartments 27 by a series of radial partitions 28, which terminate in contact with the inner face of the perforated or reticulated periphery of the mold. The central part of the internal double cone is provided with a peripheral rib 29 for supporting the reticulated circumferential covering of the mold or cylinder 25, the rib having openings therein for the free passage of air from one end of the cylinder to the other.

Heretofore in this class of machines the radial partitions of the pulp mold or cylinder 25 have been straight and flat, with the result that as the partitions are carried up the water within the compartments formed by the partitions is discharged against the adhering film of fiber, thus washing more or less of the fiber off the periphery of the cylinder. One of the objects of my invention is, as before stated, to prevent this washing off of the film by constructing the outer edges of the partitions 28 in scoop or bucket form, as shown at 30, so that they will retain all the water therein at the time the extreme outer edges of the partitions reach the water or pulp level in the vat 31. The water thus carried up by the partitions, instead of falling against the outer perforated cover of the mold or cylinder 25 and washing the adhering pulp-film therefrom, flows inwardly as the partitions ascend and onto the double cones and escapes at the ends of the mold or cylinder. The vat is provided with a supply-pipe for the pulp and with an overflow-pipe for the escape of the surplus pulp. In the machines as now constructed the overflow must extend well up into the tank and to a point about where the water would leave the compartments 27 if unobstructed by the film, so as to prevent as far as possible the water retained by the film from washing the latter off. With my scoop form of partitions I lower considerably the point where the water leaves the compartments, and hence am enabled to lower to a considerable extent the height of the overflow-pipe 32, and consequently the pulp-level in the vat, and increase the area or surface of the mold or cylinder exposed to the suction, and thus more thoroughly dry the film of pulp before it reaches the couch-roll. The overflow-pipe 32 maintains the pulp in the vat at a uniform level, and, if desired, the said pipe may be screwed into its seat, so as to render it adjustable with respect to its height, so that the level at which the overflow occurs may be varied.

The pulp mold or cylinder 25 is open at its two ends, and the latter are overlapped by flexible bands or rings 45, which latter are carried by the ends of the vat and are designed to seal the joint between the ends of the vat and the revolving mold or cylinder and prevent the ingress of pulp or air into the compartments of the mold or cylinder.

Located at the two ends and within the vat are the air or suction boxes 33. These air-boxes are located against the inner faces of the ends of the vat and are mounted on movable supports, with their inner open ends terminating in close proximity to the ends of the partitions 28, and are of such shape that as the mold or cylinder 25 revolves the boxes cover or take in the open ends of the compartments between the level of the pulp and the couch-roll. These boxes are each connected by a pipe 36 with a vertical flue 37, and the flues 37 lead to a suction-fan (not shown) which operates to maintain a partial vacuum or constant suction within the mold or cylinder, and thus not only causes the fiber to adhere thereto, but extracts the water from the pulp. In the drawings I have also shown the couch-roller open at its ends, the latter being in communication with the suction-flues 38, also leading to the suction-fan, the flues 37 and 38 being each provided with a damper by which the suction or exhaust can be regulated and controlled.

A portion of each end of the vat below the air or suction boxes opens into the chambers 40, into which the water flows as it leaves the mold or cylinder, and a valve 39 is located within each chamber 40 for regulating the discharge or escape of the water from the chamber. When it is desired to cause the pulp to adhere in a very thin sheet or film to the surface of the mold or cylinder, water is permitted to remain in the chamber 40, and as the latter is open to the compartments 27 of the mold or cylinder 25 it will be seen that the water flows freely into the latter from the chamber 40, and thus prevents the suction or partial vacuum from exerting its full force and effect upon the pulp. Hence but a comparatively small quantity adheres to the surface of the cylinder. When, however, it is desired to increase the thickness of the sheets or films the valve 39 is opened and the water permitted to escape as it issues from the cylinder.

The shaft of the pulp mold or cylinder is carried in bearing-boxes 41, integral with the air-boxes or exhaust-chambers, and the boxes 41 are pivotally supported in the yokes 42, carried by the levers 43. These levers are pivoted to the vat or tub, and each is provided with adjusting mechanism 44, by which the mold or cylinder can be moved toward or away from the couch-roll. As the air or exhaust chambers or boxes are carried on the shaft of the mold or cylinder, it follows that when the latter is moved or adjusted the air boxes or chambers move therewith. The pulp mold or cylinder receives its motion from the couch-roll through the pinions 24 and 44, the depth of the teeth of said pinions being such that these parts will not become disengaged by any variation in the position of the mold or cylinder relatively to the couch-roller.

It is evident many slight changes might be resorted to in the relative arrangement of parts herein shown and described without departing from the spirit and scope of my invention. Hence I would have it understood that I do not wish to confine myself to the exact arrangement of parts herein shown and described; but, Having fully described my invention, what I claim as new, and desire to secure by Letters Patent, is—

1. In a machine for making pulp-board, the combination with a vat, of a pulp mold or cylinder disposed over and adapted to pass through pulp therein, said mold or cylinder comprising a series of scoop-shaped radial partitions and an open-work cover.

2. In a machine for making pulp-board, the combination with a vat, of a pulp mold or cylinder having a double cone centrally therein, partitions radiating from said cone, a reticulated cover and a perforated rib projecting from the center of said double cone and supporting the central portion of said reticulated cover.

3. In a machine for making pulp-board, the combination with a vat, of a pulp mold or cylinder, a double cone centrally within said cylinder, partitions having scoop-shaped outer ends radiating from said cones, and a reticulated cover.

4. In a machine for making pulp-board, the combination with a vat, a pulp mold or cylinder therein, and a couch-roll for taking the pulp from the mold or cylinder of uprights or standards projecting above the couch-roll, a winding-roll between said uprights or standards, vertically-movable bearings in said standards upon which the journals of the winding-roll are mounted means for moving the bearings and winding-roll up and down.

5. In a machine for making pulp-board, the combination with a vat, a pulp mold or cylinder therein and a couch-roll for taking the pulp from the mold or cylinder, of an upright at each end of the machine, a winding-roll a screw carried by each upright, a bearing in each upright in which the respective journals of the winding-roll are mounted, said bearings engaging the screw and means for rotating the screws in unison.

6. In a machine for making pulp-board, the combination with a vat, a pulp mold or cylinder therein, and a couch-roll, of an upright at each end of the machine, a bearing carried by each upright, a winding-roll having trunnions mounted upon said bearings so as to be movable up and down therewith, and a weighted lever bearing on each trunnion.

7. In a machine for making pulp-board, the combination with a vat, a pulp mold or cylinder therein, and a couch-roll, of an upright at each end of the machine, a bearing carried by each upright, means for adjusting said bearings vertically, a winding-roll having trunnions mounted upon said bearings so as to move up and down therewith, and a weighted lever pivoted to each movable bearing and adapted to bear on the trunnions of the winding-roll.

8. In a machine for making pulp-board, the combination with a vat, and suction-flues leading from both ends thereof of a cylinder located within the vat, and divided into compartments by a series of radial partitions, and air or suction boxes interposed between the cylinder and the open ends of the air-flues for conducting the exhaust-air from the cylinder to the flues.

9. In a machine for making pulp-board, the combination with a vat and suction-flues leading from both ends thereof, of a shaft within the vat, a cylinder on said shaft, air or suction boxes carried by suitable supports and forming bearings for the shaft, substantially as set forth.

10. In a machine for making pulp-board, the combination with a vat and a vertically-adjustable overflow-pipe therein, of a pulp mold or cylinder within said vat, a couch-roll, a winding-roll, and means at both ends of the cylinder for exhausting the air therefrom.

In testimony whereof I have signed this specification in the presence of two subscribing witnesses.

FRANK EUGENE KEYES.

Witnesses:
G. F. DOWNING,
A. W. BRIGHT.